US012810630B2

(12) United States Patent
Tsuda

(10) Patent No.: US 12,810,630 B2
(45) Date of Patent: Nov. 24, 2026

(54) DRIVING ASSISTANCE APPARATUS AND DRIVING ASSISTANCE METHOD

(71) Applicant: ISUZU MOTORS LIMITED, Yokohama (JP)

(72) Inventor: Ryuta Tsuda, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 167 days.

(21) Appl. No.: 19/011,900

(22) Filed: Jan. 7, 2025

(65) Prior Publication Data

US 2025/0232598 A1 Jul. 17, 2025

(30) Foreign Application Priority Data

Jan. 15, 2024 (JP) ................................. 2024-004000

(51) Int. Cl.
*G06V 20/59* (2022.01)
*G06T 7/73* (2017.01)
*G06V 40/16* (2022.01)

(52) U.S. Cl.
CPC .............. *G06V 20/597* (2022.01); *G06T 7/73* (2017.01); *G06V 40/168* (2022.01); *G06T 2207/30201* (2013.01); *G06T 2207/30268* (2013.01)

(58) Field of Classification Search
CPC ...... G06V 20/597; G06V 40/168; G06T 7/73; G06T 2207/30201; G06T 2207/30268
See application file for complete search history.

(56) References Cited

U.S. PATENT DOCUMENTS

2018/0232588 A1* 8/2018 Matsumura .......... G06V 20/597
2023/0159010 A1 5/2023 Tsuda

FOREIGN PATENT DOCUMENTS

JP 2021144580 A * 9/2021 ............... G08G 1/16
JP 2021-157436 A 10/2021
WO WO 2016038784 A1 * 3/2016 ........... G06V 10/143

* cited by examiner

*Primary Examiner* — David F Dunphy
(74) *Attorney, Agent, or Firm* — PROCOPIO, CORY, HARGREAVES & SAVITCH LLP

(57) ABSTRACT

A driving assistance apparatus has: an identifying section that identifies a degree of likelihood that a driver of a vehicle has a worn article on a face on the basis of one or more feature points of the face extracted from captured images; a deciding section that decides a state determination period during which it is determined whether or not a state of the driver is an anomalous state, and an anomaly range representing an orientation of the face observed in a case where the state of the driver is an anomalous state, the state determination period and the anomaly range corresponding to the degree of likelihood; and a determining section that determines whether or not the state of the driver is an anomalous state by determining whether or not an orientation of the face based on the one or more feature points is included in the anomaly range.

15 Claims, 8 Drawing Sheets

| TYPES OF ANOMALOUS STATE | INITIAL RANGE OF STATE DETERMINATION PERIOD (SECONDS) |
|---|---|
| FORWARD-FALLEN POSTURE | 3 |
| LOOKING-DOWN POSTURE | 7 |
| BACKWARD-LEANING POSTURE | 5 |
| SHRIMP-LIKE BACKWARD-ARCHED POSTURE | 5 |
| SIDEWAYS-FALLEN POSTURE | 5 |
| SIDEWAYS-LEANING POSTURE | 5 |

FIG. 8

DRIVING ASSISTANCE APPARATUS AND DRIVING ASSISTANCE METHOD

CROSS-REFERENCE TO RELATED APPLICATIONS

The present application claims priority to Japanese Patent Application number 2024-004000, filed on Jan. 15, 2024, contents of which are incorporated herein by reference in its entirety.

BACKGROUND OF THE INVENTION

The present disclosure relates to a driving assistance apparatus and a driving assistance method for detecting an anomalous state of a driver of a mobile body such as a vehicle. A conventional driving assistance apparatus determines whether or not the state of a driver of a vehicle is an anomalous state by analyzing a captured image generated by capturing an image of the face of the driver, and acquiring the postural change amount or closed-eye state of the driver (e.g. JP-2021-157436-A).

In the driving assistance apparatus described above, the number of feature points of the face of a driver to be sensed in a captured image decreases in a case where the driver has a worn article such as a mask on her/his face, because the face is covered with the worn article. As a result, there have been problems that determination is stopped even if the state of the driver is an anomalous state, that an erroneous determination that the state of the driver is an anomalous state is made even if the state of the driver is not an anomalous state, and so on.

BRIEF SUMMARY OF THE INVENTION

The present disclosure has been made in view of these matters, and an object thereof is to enhance the precision of determination as to the state of a driver who has a worn article on her/his face.

A driving assistance apparatus according to a first aspect of the present disclosure has: an identifying section that identifies a degree of likelihood that a driver of a vehicle has a worn article on a face on a basis of one or more feature points of the face extracted from one or more captured images generated by capturing images of the face of the driver; a deciding section that decides a state determination period during which it is determined whether or not a state of the driver is an anomalous state, and an anomaly range representing an orientation of the face observed in a case where the state of the driver is an anomalous state, the state determination period and the anomaly range corresponding to the degree of likelihood; and a determining section that determines whether or not the state of the driver is an anomalous state by determining whether or not an orientation of the face based on the one or more feature points is included in the anomaly range in the state determination period.

A driving assistance method according to a second aspect of the present disclosure is a driving assistance method executed by a computer, the driving assistance method having: identifying a degree of likelihood that a driver of a vehicle has a worn article on a face on a basis of one or more feature points of the face extracted from one or more captured images generated by capturing images of the face of the driver; deciding a state determination period during which it is determined whether or not a state of the driver is an anomalous state, and an anomaly range representing an orientation of the face observed in a case where the state of the driver is an anomalous state, the state determination period and the anomaly range corresponding to the degree of likelihood; and determining whether or not the state of the driver is an anomalous state by determining whether or not an orientation of the face based on the one or more feature points is included in the anomaly range in the state determination period.

BRIEF DESCRIPTION OF THE DRAWINGS

FIG. 8 is a figure depicting initial ranges of the state determination period according to a modification example.

DETAILED DESCRIPTION OF THE INVENTION

Hereinafter, the disclosure will be described through embodiments of the disclosure. The below embodiments, however, are not intended to limit the disclosure according to the claims, and all combinations of features described in the embodiments are not necessarily essential to the solutions of the disclosure.

<Summary of Vehicle S>

Figure 1:
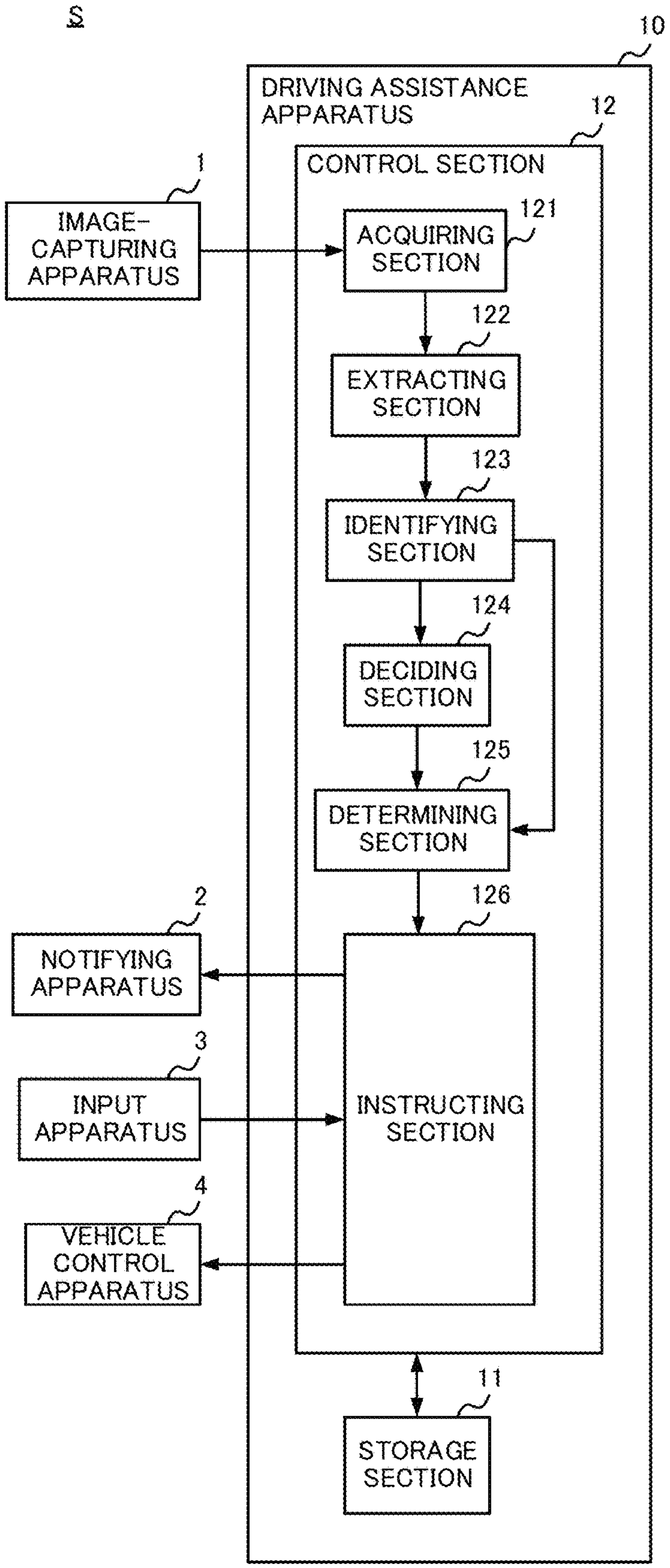
FIG. 1 is a figure for explaining a summary of a vehicle S according to the present embodiment.

FIG. 1 is a figure for explaining a summary of a vehicle S according to the present embodiment. The vehicle S depicted in FIG. 1 includes an image-capturing apparatus 1, a notifying apparatus 2, an input apparatus 3, a vehicle control apparatus 4, and a driving assistance apparatus 10. The vehicle S has a function to make an anomalous state determination as to whether or not the state of the driver of the vehicle S is an anomalous state. The anomalous state is a state where the posture of the driver is distorted, and the driver cannot drive the vehicle S, and, for example, is at least any one of states where the posture of the driver is a forward-fallen posture, a looking-down posture, a backward-leaning posture, a shrimp-like backward-arched posture, a sideways-leaning posture, and a sideways-fallen posture.

The image-capturing apparatus 1 is a camera that can capture images of a subject no matter whether it is day or night, and is provided in front of the driver's seat in the advancing direction of the vehicle S and provided lower than the position of the face of the driver seated on the driver's seat in the height direction of the vehicle S. For example, the image-capturing apparatus 1 is an infrared camera. The image-capturing apparatus 1 generates captured images of the face of the driver seated on the driver's seat at predetermined control timings (e.g. which come after every 0.1 seconds), and outputs the captured images to the driving assistance apparatus 10.

The notifying apparatus 2 is an apparatus for notifying the driver that the driver is in an anomalous state. For example, in a case where state information representing that the state of the driver is an anomalous state is acquired from the driving assistance apparatus 10, the notifying apparatus 2 causes a speaker of the notifying apparatus 2 to output a warning sound, causes a display of the notifying apparatus 2 to display a warning message, and so on. For example, in a case where operation information representing that the input apparatus 3 has accepted operation for stopping outputting of a warning sound and displaying of a warning message is acquired from the driving assistance apparatus 10, the notifying apparatus 2 causes the outputting of a warning sound and the displaying of a warning message to stop.

The input apparatus 3 is an apparatus for accepting operation performed by the driver, and includes, for example, an operation button or a touch panel provided to at least any one of the steering of the vehicle S and the instrument panel of the vehicle S. For example, in a case where operation to stop outputting of a warning sound and displaying of a warning message is accepted from the driver who has recognized that the state of her/himself has been an anomalous state, the input apparatus 3 outputs operation information representing the operation to the driving assistance apparatus 10.

For example, the vehicle control apparatus 4 is an apparatus including one or more processors such as a CPU (Central Processing Unit) or an ECU (Electronic Control Unit). For example, the vehicle control apparatus 4 accelerates/decelerates the vehicle S depending on operation performed by the driver. For example, in a case where instruction information representing an instruction for stopping the vehicle S is acquired from the driving assistance apparatus 10, the vehicle control apparatus 4 stops the vehicle S.

The driving assistance apparatus 10 executes a process of making an anomalous state determination on the basis of a captured image generated by capturing an image of the face of the driver, and acquired from the image-capturing apparatus 1. For example, in a case where it is determined that the state of the driver is an anomalous state, the driving assistance apparatus 10 causes the notifying apparatus 2 to start outputting a warning sound and displaying a warning message, causes the vehicle control apparatus 4 to stop the vehicle S, and so on. The driving assistance apparatus 10 may have a housing including electronic components, or may be a printed board on which electronic components are implemented.

For example, the driving assistance apparatus 10 identifies the orientation of the face on the basis of the positions of the eyes, mouth, nose, and facial outline (face line) of the driver extracted from a captured image, and determines whether or not the orientation of the face is within a predetermined range, to thereby determine whether or not the state of the driver is an anomalous state. For example, the orientation of the face is represented by the orientations in the pitch direction, yaw direction, and roll direction relative to the advancing direction, and is represented by the angle in each direction relative to a reference direction.

Figure 2A:
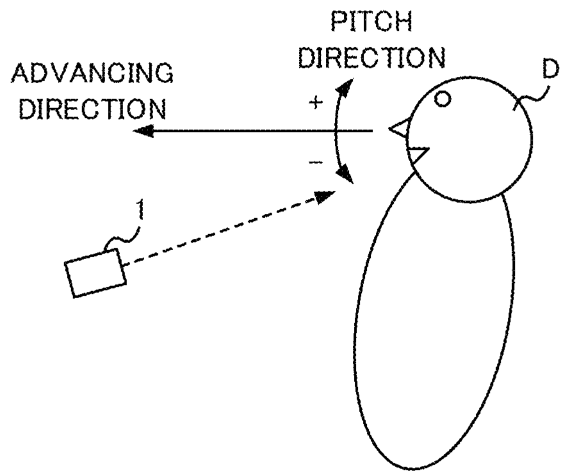
FIG. 2A depicts the orientation of the face in the pitch direction relative to the advancing direction of the vehicle S.
Figure 2B:
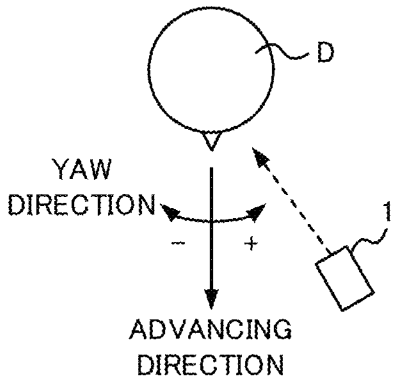
FIG. 2B depicts the orientation of the face in the yaw direction relative to the advancing direction of the vehicle S.
Figure 2C:
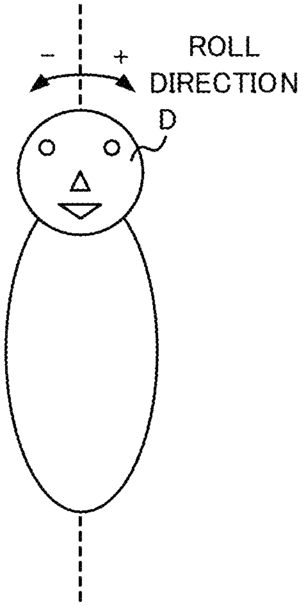
FIG. 2C depicts the orientation of the face in the roll direction relative to the advancing direction of the vehicle S.

FIGS. 2A, 2B, and 2C are each a figure for explaining the orientation of the face of the driver D. FIG. 2A depicts the orientation of the face in the pitch direction relative to the advancing direction of the vehicle S, FIG. 2B depicts the orientation of the face in the yaw direction relative to the advancing direction of the vehicle S, and FIG. 2C depicts the orientation of the face in the roll direction relative to the advancing direction of the vehicle S. FIG. 2C is a figure of the driver as seen in a direction from the front side of the advancing direction of the forward-moving vehicle S, to the rear side of the advancing direction. As depicted in FIGS. 2A, 2B, and 2C, the angles in the pitch direction, yaw direction, and roll direction relative to the advancing direction of the vehicle S are represented as angles as measured relative to reference directions (zero degrees) which coincide with directions of the face of the driver D who is looking forward in the advancing direction. Note that, in the following explanation, "the pitch direction, yaw direction, and roll direction relative to the advancing direction of the vehicle S" are simply called "the pitch direction, yaw direction, and roll direction" in some cases.

Figure 3:
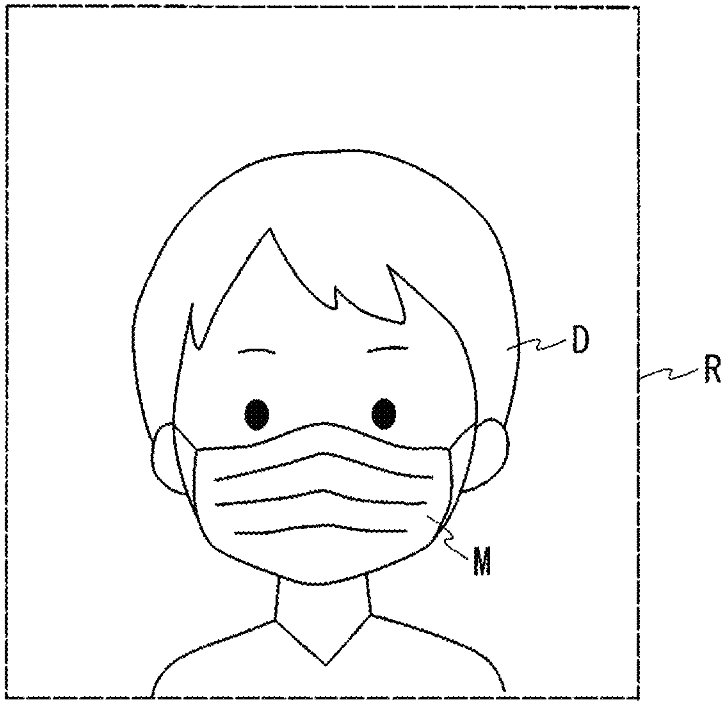
FIG. 3 is a figure depicting an example of the driver who has a mask M, which is a worn article, on her/his face.

Meanwhile, the driver D has a worn article such as a mask or a headset on her/his face, in some cases. FIG. 3 is a figure depicting an example of the driver who has the mask M, which is a worn article, on her/his face. In a case where the driver D has the mask M on as depicted in FIG. 3, even if the driving assistance apparatus 10 can correctly identify the orientations of the face in the yaw direction and roll direction on the basis of the positions of the eyes of the driver D, there is a possibility that the driving assistance apparatus 10 erroneously identifies the orientation of the face in the pitch direction by erroneously recognizing irregularities of the mask M as the facial outline.

Furthermore, the driver D has the mask M on with either one of the nose and the mouth being uncovered, has the mask M on while simultaneously having a worn article (e.g. a headset) different from the mask M on, and so on, in some cases. In this case, the driving assistance apparatus 10 correctly identifies or erroneously identifies the orientation of the face in the pitch direction depending on the orientation of the face of the driver D, and accordingly it takes a longer time to correctly identify the orientation of the face in the pitch direction. As a result of this, there is a possibility that the driving assistance apparatus 10 erroneously determines that the state of the driver D is an anomalous state even in a case the driver D is driving at a normal posture.

In view of this, the driving assistance apparatus 10 identifies the degree of likelihood that the driver D has a worn article on her/his face. In the following explanation, "the degree of likelihood that the driver has a worn article on her/his face" is simply called "the degree of likelihood" in some cases. The driving assistance apparatus 10 identifies a first degree, a second degree, or a third degree as the degree of likelihood. For example, the first degree represents a state where it is estimated that the probability that the driver D has a worn article on her/his face is 100%. For example, the second degree represents a state where it is estimated that there is a possibility that the driver D has a worn article on her/his face (i.e. the probability that the driver has a worn article on her/his face is greater than 0 and lower than 100%). The third degree represents a state where it is estimated that the probability that the driver D has a worn article on her/his face is 0%.

Then, depending on the degree of likelihood, the driving assistance apparatus 10 decides a state determination period during which an anomalous state determination is made, and an anomaly range of the orientation of the face used for determining that the state of the driver is an anomalous state. For example, in a case where the degree of likelihood is the first degree, the driving assistance apparatus 10 makes the anomaly range smaller than in a case where the degree of likelihood is an alternative degree. Due to the operation performed by the driving assistance apparatus 10 in this manner, the driving assistance apparatus 10 can reduce erroneous determinations of the state of the driver D even if irregularities of a worn article are erroneously recognized as the facial outline, since the anomaly range is small.

Furthermore, for example, in a case where the degree of likelihood is the second degree, the driving assistance apparatus 10 makes the state determination period longer than in a case where the degree of likelihood is an alternative degree. Due to the operation performed by the driving assistance apparatus 10 in this manner, the driving assistance apparatus 10 can correctly determine the state of the driver D even in a case where it takes a longer time to correctly identify the orientation of the face depending on a state where the driver D has a worn article on. As a result of this, the driving assistance apparatus 10 can enhance the precision of determination as to whether or not the state of the driver D is an anomalous state.

Hereinafter, the configuration of and operations performed by the driving assistance apparatus 10 are explained in detail.

<Configuration of Driving Assistance Apparatus 10>

As depicted in FIG. 1, the driving assistance apparatus 10 has a storage section 11 and a control section 12. The control section 12 has an acquiring section 121, an extracting section 122, an identifying section 123, a deciding section 124, a determining section 125, and an instructing section 126.

The storage section 11 has a storage medium such as a ROM (Read Only Memory), a RAM (Random Access Memory), an HDD (Hard Disk Drive), or an SSD (Solid State Drive). The storage section 11 has stored thereon programs to be executed by the control section 12. The storage section 11 has stored thereon various types of information for making anomalous state determinations.

For example, the control section 12 is a processor such as a CPU or an ECU. By executing the programs stored on the storage section 11, the control section 12 functions as the acquiring section 121, the extracting section 122, the identifying section 123, the deciding section 124, the determining section 125, and the instructing section 126. Note that the control section 12 may be configured using one processor, or may be configured using a combination of a plurality of processors or one or more processors and an electronic circuit.

Hereinafter, the configuration of each section realized by the control section 12 is explained.

The acquiring section 121 acquires, from the image-capturing apparatus 1, one or more captured images generated by capturing images of the face of the driver D of the vehicle S. For example, the acquiring section 121 acquires the one or more captured images by acquiring captured images at predetermined control timings. For example, the predetermined control timings come after every 0.1 seconds. The extracting section 122 extracts one or more feature points (hereinafter, called "facial feature points") of the face from the one or more captured images acquired by the acquiring section 121. For example, the facial feature points include the positions of constituent elements of the face such as the eyebrows, the eyes, the nose, and the mouth, the position of the facial outline, and the orientation of the line of sight. For example, the extracting section 122 extracts one or more facial feature points at predetermined control timings.

The identifying section 123 identifies the position of the face of the driver D, and the orientation of the face of the driver D on the basis of the one or more facial feature points extracted from the captured images by the extracting section 122. For example, the identifying section 123 identifies the position of the face of the driver D on the basis of the position of the facial outline included in the facial feature points. For example, the identifying section 123 identifies the orientation of the face in the pitch direction relative to the advancing direction of the vehicle S on the basis of the position of the facial outline and the position of the mouth included in the facial feature points. For example, the identifying section 123 identifies the orientations of the face in the yaw direction and roll direction relative to the advancing direction of the vehicle S on the basis of the positions of the eyes included in the facial feature points.

The identifying section 123 identifies the degree of likelihood that the driver D has a worn article on her/his face on the basis of the one or more facial feature points extracted from the captured images by the extracting section 122. For example, at predetermined control timings, the identifying section 123 determines whether or not one or more mouth feature points representing the mouth of the face are included in the one or more facial feature points extracted by the extracting section 122. Then, for example, in a case where it is determine that mouth feature points are not included in a wearing determination period including a plurality of predetermined control timings, the identifying section 123 identifies, as the degree of likelihood, the first degree representing that the driver D has a worn article on her/his face. For example, in a case where the control timings come after every 0.1 seconds, the duration of the wearing determination period is equal to or longer than 0.2 seconds, and equal to or shorter than 0.5 seconds.

Figure 4:
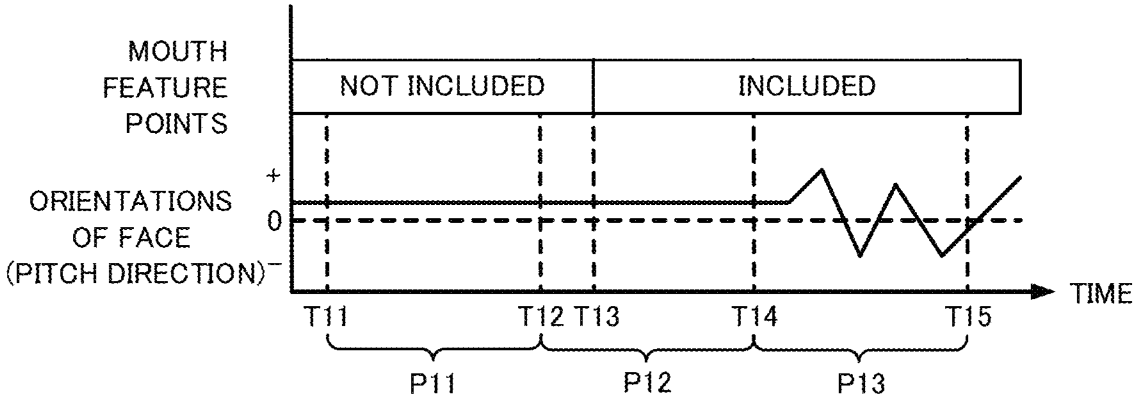
FIG. 4 is a figure for explaining an operation to identify the degree of likelihood.

FIG. 4 is a figure for explaining an operation to identify the degree of likelihood. The horizontal axis of FIG. 4 represents times, and the vertical axis of FIG. 4 represents "mouth feature points" which are results of determination as to whether or not mouth feature points are included in facial feature points, and "orientations of the face (pitch direction)" which are results of identification of the orientation of the face in the pitch direction relative to the advancing direction of the vehicle S. "Orientations of the face (pitch direction)" depicted in FIG. 4 represent positive values in a case where the orientation of the face of the driver D is an upward orientation, and represent negative values in a case where the orientation of the face of the driver D is a downward orientation. For example, the identifying section 123 determines that mouth feature points are not included in facial feature points extracted from a plurality of captured images by the extracting section 122 in a wearing determination period P11 from time T11 until time T12, and identifies the first degree as the degree of likelihood.

For example, in a case where it is determined that one or more mouth feature points are included in one or more facial feature points, and determined that mouth feature points are not included in facial feature points in the wearing determination period, the identifying section 123 identifies, as the degree of likelihood, the second degree representing that the there is a possibility that the driver D has a worn article on her/his face. A state where "there is a possibility that the driver D has a worn article on her/his face" is a state where the driver D possibly, but not surely has a worn article on. For example, this state includes a case where the driver D has a worn article on, but the nose or mouth is uncovered, a case where the driver D has a plurality of worn article on, and a case where a worn article can be easily erroneously recognized as a constituent element (e.g. the nose) of the face because the shape of the worn article is similar to the shape of irregularities of the face. For example, the identifying section 123 determines that mouth feature points are not included at times before time T13, and determines that mouth feature points are included at times subsequent to time T13, in a wearing determination period P12 from time T12 until time T14 depicted in FIG. 4. Then, the identifying section 123 identifies the second degree as the degree of likelihood.

The identifying section 123 may identify the second degree as the degree of likelihood on the basis of the orientation of the face in the pitch direction relative to the advancing direction of the vehicle S. For example, the identifying section 123 determines whether the orientation of the face in the pitch direction relative to the advancing direction of the vehicle S is an upward orientation or a downward orientation at predetermined control timings. Then, for example, the identifying section 123 identifies the second degree as the degree of likelihood in a case where determinations that the orientation of the face is an upward orientation, and determinations that the orientation of the face is a downward orientation alternate repeatedly in the wearing determination period.

For example, the identifying section 123 identifies that, in a wearing determination period P13 from time T14 until time T15 depicted in FIG. 4, the orientation of the face in the pitch direction relative to the advancing direction of the vehicle S alternate repeatedly between an upward orientation and a downward orientation (so-called hunting has occurred). Then, for example, even if it is determined that mouth feature points are included in each captured image in the wearing determination period P13, the identifying section 123 identifies the second degree as the degree of likelihood because of the occurrence of hunting. Due to the operation performed by the identifying section 123 in this manner, even if the extracting section 122 erroneously extracts facial feature points, the identifying section 123 can estimate, on the basis of the orientation of the face, whether or not facial feature points are erroneously extracted, and accordingly can reduce erroneous identification of the degree of likelihood.

For example, at predetermined timings, the identifying section 123 determines whether or not one or more mouth feature points representing the mouth of the face are included in one or more extracted facial feature points, and whether the orientation of the face in the pitch direction relative to the advancing direction of the vehicle S is an upward orientation or a downward orientation. Then, for example, the identifying section 123 identifies the third degree as the degree of likelihood in a case where, in the wearing determination period including a plurality of predetermined timings, a mouth feature point is included in each facial feature point extracted from each captured image, and the orientation of the face in the pitch direction relative to the advancing direction of the vehicle S does not alternate repeatedly between an upward orientation and a downward orientation. The third degree is a degree representing that the driver D does not have a worn article on her/his face.

The deciding section 124 decides the anomaly range corresponding to the degree of likelihood identified by the identifying section 123, the anomaly range representing orientations of the face that are observed in a case where the state of the driver D is an anomalous state. An initial range of each of the pitch direction, yaw direction, and roll direction relative to the advancing direction of the vehicle S is specified in the anomaly range, and is stored on the storage section 11. For example, in a case where the degree of likelihood is the second degree or the third degree, the deciding section 124 decides the initial ranges of the anomaly range stored on storage section 11 as the anomaly range.

For example, in a case where the degree of likelihood is the first degree, the deciding section 124 makes smaller the range of the orientation of the face in the pitch direction relative to the advancing direction of the vehicle S, which range is represented by the anomaly range, than in a case where the degree of likelihood is a degree different from the first degree (i.e. the second degree or the third degree). For example, in a case where the degree of likelihood is the first degree, the deciding section 124 identifies the range of the orientation of the face in the pitch direction relative to the advancing direction of the vehicle S included in the initial ranges of the anomaly range, and decides a range smaller than the range as the anomaly range in the pitch direction. Specifically, in a case where the initial range of the anomaly range in the pitch direction relative to the advancing direction of the vehicle S is "equal to or greater than −90 degrees, and smaller than −20 degrees," the deciding section 124 decides "equal to or greater than −90 degrees and smaller than −30 degrees" as the anomaly range in the pitch direction since the degree of likelihood is the first degree.

Due to the operation performed by the deciding section 124 in this manner, the determining section 125 can make smaller a range used for determining that the state of the driver D is an anomalous state, and accordingly can reduce erroneous determinations of the state of the driver D on the basis of the orientation of the face erroneously identified by the identifying section 123. Note that in a case where the degree of likelihood is the first degree, the deciding section 124 decides the initial ranges stored on the storage section 11 as the anomaly range of the orientations of the face in the yaw direction and roll direction relative to the advancing direction of the vehicle S.

The deciding section 124 decides the state determination period corresponding to the degree of likelihood identified by the identifying section 123, the state determination period being used for determining whether or not the state of the driver D is an anomalous state. For example, initial values of the duration of the state determination period are equal to or longer than three seconds and equal to or shorter than seven seconds, and are stored on the storage section 11. For example, in a case where the degree of likelihood is the first degree or the third degree, the deciding section 124 decides, as the state determination period, an initial value of the state determination period stored on the storage section 11.

For example, in a case where the degree of likelihood is the second degree, the deciding section 124 makes the state determination period longer than in a case where the degree of likelihood is a degree different from the second degree (i.e. the first degree or the third degree). For example, in a case where the degree of likelihood is the second degree, the deciding section 124 decides, as the state determination period, a period whose duration is obtained by multiplying an initial value of the state determination period stored on the storage section 11 by 2. Due to the operation performed by the deciding section 124 in this manner, the deciding section 124 can enhance the probability that the degree of likelihood switches from the second degree to an alternative degree in the state determination period. As a result, the determining section 125 can enhance the probability that an anomalous state determination can be executed after the state switches from a state where the identifying section 123 is likely to erroneously identify the orientation of the face to a state where the identifying section 123 can easily correctly identify the orientation of the face, and accordingly can reduce erroneous determinations of the state of the driver D.

The deciding section 124 may decide the state determination period on the basis of the degree of likelihood and the angle of the orientation of the face identified by the identifying section 123. For example, at predetermined control timings in the state determination period, the deciding section 124 calculates the angle difference between: the angle of the orientation of the face in the pitch direction relative to the advancing direction of the vehicle S at a time which is a predetermined control timing interval after; and the angle of the orientation of the face at a time which is the predetermined control timing interval before the time. Then, for example, the deciding section 124 makes the state determination period longer in a case where the degree of likelihood identified by the identifying section 123 is the second degree, and the calculated angle difference is equal to or greater than a threshold. The threshold is the minimum value of angle differences by which it can be estimated that the identifying section 123 has erroneously identified the orientation of the face due to a worn article that the driver D has on her/his face, and is a value decided by experiments or simulations.

Figure 5:
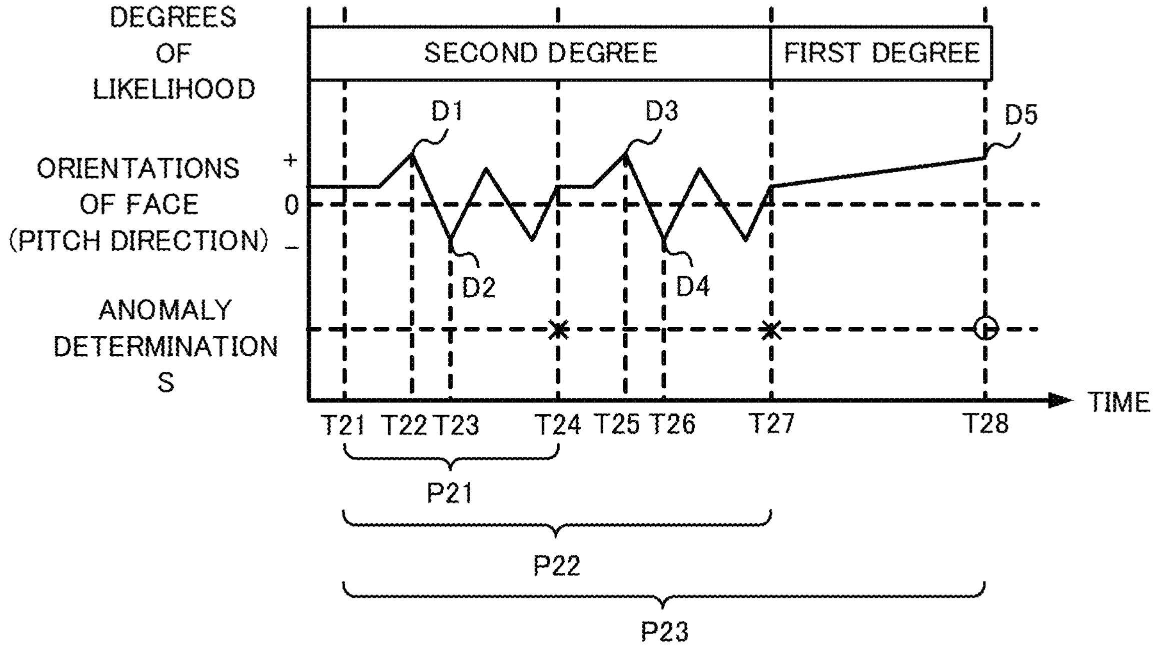
FIG. 5 is a figure for explaining an operation to decide a state determination period.

FIG. 5 is a figure for explaining an operation to decide the state determination period. The horizontal axis of FIG. 5 represents time. The vertical axis of FIG. 5 represents: the "degree of likelihood" identified by the identifying section 123 for each wearing determination period; "orientations of the face (pitch direction)" representing the angle of the orientation of the face in the pitch direction relative to the advancing direction of the vehicle S; and "anomaly determinations" which are timings at which the determining section 125 has executed anomalous state determinations. "x" depicted in FIG. 5 represents a timing at which an anomalous state determination has been canceled, and "○" depicted in FIG. 5 represents a timing at which an anomalous state determination has been executed.

For example, the deciding section 124 identifies that the angle difference between an angle D2 of the orientation of the face at time T23 and an angle D1 of the orientation of the face at time T22 which is a predetermined control timing interval before time T23 is equal to or greater than the threshold, and the degree of likelihood from time T22 until time T23 is the second degree. Then, at time T23, the deciding section 124 makes the state determination period longer by changing the state determination period from a period P21 to a period P22. Similarly to this, the deciding section 124 identifies that the angle difference between an angle D4 of the orientation of the face at time T26 and an angle D3 of the orientation of the face at time T25 is equal to or greater than the threshold, and the degree of likelihood from time T25 to time T26 is the second degree. Then, at time T26, the deciding section 124 further changes the state determination period from the period P22 to a period P23.

Next, since the angle difference calculated from time T27 until time T28 is smaller than the threshold, the deciding section 124 does not change the state determination period from the period P23, but decides a new state determination period at time T28. Due to the operation performed by the deciding section 124 as described above, the deciding section 124 can extend a period including times at which the identifying section 123 is likely to erroneously identify the orientation of the face of the driver D. As a result, the determining section 125 can execute an anomalous state determination in time during which the identifying section 123 can easily correctly identify the orientation of the face in the state determination period decided by the deciding section 124, and accordingly can enhance the precision of anomalous state determination. Note that the period P21 decided by the deciding section 124, the difference between the period P22 and the period P21, and the difference between the period P23 and the period P22 may be the same or may be different.

The deciding section 124 may make the state determination period longer in a case where the calculated angle difference is equal to or greater than the threshold, and the degree of likelihood is the first degree. Due to the operation performed by the deciding section 124 in this manner, the deciding section 124 can make time for determining whether or not the state of the driver D is an anomalous state longer in a case where the driver D has a worn article on her/his face. As a result, the probability that the determining section 125 executes an anomalous state determination in time during which the identifying section 123 has erroneously identified the orientation of the face can be lowered, and accordingly the precision of anomalous state determination can be enhanced.

The determining section 125 executes an anomalous state determination as to whether or not the state of the driver D is an anomalous state by determining whether or not the orientation of the face based on facial feature points is included in the anomaly range in the state determination period. That "the orientation of the face is included in the anomaly range" means that the orientation of the face regarding at least one of the orientation of the face in the pitch direction, the orientation of the face in the yaw direction, and the orientation of the face in the roll direction relative to the advancing direction is included in the anomaly range corresponding to the orientation of the face.

For example, at each predetermined control timing included in the state determination period, the determining section 125 determines whether or not the orientation of the face identified by the identifying section 123 is included in the anomaly range decided by the deciding section 124. Then, for example, the determining section 125 determines that the state of the driver D is an anomalous state in a case where it is determined that the orientation of the face is included in the anomaly range in a predetermined proportion or more of control timings from among a plurality of control timings included in the state determination period. On the other hand, for example, the determining section 125 determines that the state of the driver D is not an anomalous state in a case where it is determined that the orientation of the face is included in the anomaly range in a proportion, lower than the predetermined proportion, of control timings from among the plurality of control timings included in the state determination period. The predetermined proportion is a proportion decided by experiments or simulations.

For example, in a case where the degree of likelihood identified by the identifying section 123 is the first degree or the third degree, the determining section 125 determines whether or not the orientation of the face identified by the identifying section 123 is included in the anomaly range decided by the deciding section 124 depending on the degree of likelihood. For example, in a case where the degree of likelihood is the second degree, after the degree of likelihood has changed from the second degree to an alternative degree different from the second degree, the determining section 125 determines whether or not the orientation of the face identified by the identifying section 123 is included in the anomaly range corresponding to the alternative degree. Due to the operation performed by the determining section 125 in this manner, the determining section 125 can reduce execution of anomalous state determinations in a state where a determination as to whether or not the driver D has a worn article on her/his face is ambiguous.

The determining section 125 may determine whether or not the state of the driver D is an anomalous state in a case where the angle difference between a plurality of orientations of the face calculated after the degree of likelihood has changed from the second degree to an alternative degree in the state determination period is smaller than the threshold. For example, the deciding section 124 calculates the angle difference of the orientation of the face in the pitch direction relative to the advancing direction of the vehicle S after the degree of likelihood has changed from the second degree to the first degree in time from time T27 until time T28 included in a state determination period P23 depicted in FIG. 5. Then, the determining section 125 determines whether or not the orientation of the face identified by the identifying section 123 at time T27 or later is included in the anomaly range corresponding to the first degree decided by the deciding section 124 because the angle difference of the orientation of the face calculated at time T27 or later is smaller than the threshold in the state determination period P23.

Due to the operation performed by the determining section 125 as described above, the determining section 125 can reduce execution of anomalous state determinations in a state where a determination as to whether or not the driver D has a worn article on her/his face is ambiguous. Furthermore, the determining section 125 can reduce execution of anomalous state determinations in a state where the identifying section 123 has erroneously identified the orientation of the face of the driver D. As a result, the determining section 125 can enhance the precision of anomalous state determination.

Meanwhile, even if the identifying section 123 erroneously identifies the posture of the driver D (i.e. the position of the face or the orientation of the face) because the driver D has a worn article on, and mouth feature points are not included in facial feature points, the orientation of the line of sight of the driver D included in the facial feature points can be correctly identified in some cases. In view of this, the determining section 125 may re-determine whether or not the state of the driver D is an anomalous state on the basis of the orientation of the line of sight of the driver D after an anomalous state determination based on the orientation of the face of the driver D is executed.

For example, the determining section 125 re-determines whether or not the state of the driver D is an anomalous state provided that the degree of likelihood is the first degree, and it is determined that the state of the driver D is an anomalous state because the orientation of the face is included in the anomaly range. For example, the determining section 125 re-determines whether or not the state of the driver D is an anomalous state on the basis of a determination result of a determination as to whether or not the orientation of the line of sight of the driver D included in facial feature points is the forward direction in the advancing direction of the vehicle S. For example, the determining section 125 re-determines that the state of the driver D is not an anomalous state in a case where the orientation of the line of sight of the driver D is the forward direction in the advancing direction of the vehicle S, and re-determines that the state of the driver D is an anomalous state in a case where the orientation of the line of sight of the driver D is a direction different from the forward direction in the advancing direction of the vehicle S.

For example, in a case where a result of execution of an anomalous state determination before a re-determination, and a result of the re-determination are different from each other, the determining section 125 treats the result of the re-determination as the determination result. Due to the operation by the determining section 125 in this manner, the determining section 125 can highly precisely determine whether or not the state of the driver D is an anomalous state even in a case where mouth feature points are not included in facial feature points. In addition, the determining section 125 may not determine whether or not the state of the driver D is an anomalous state in a case where the degree of likelihood is the first degree. Due to the operation performed by the determining section 125 in this manner, the determining section 125 can lower the probability that the determining section 125 erroneously determines the state of the driver D.

On the basis of a determination result determined by the determining section 125, the instructing section 126 notifies the driver D that the state of the driver D is anomalous, stops the vehicle S, and so on. For example, in a case where the determining section 125 determines that the state of the driver D is an anomalous state, the instructing section 126 causes a speaker of the notifying apparatus 2 to output a warning sound by outputting, to the notifying apparatus 2, state information representing that the state of the driver D is an anomalous state. For example, the instructing section 126 causes a display of the notifying apparatus 2 to display a warning message by outputting state information to the notifying apparatus 2.

The instructing section 126 causes the notifying apparatus 2 to stop outputting of a warning sound and displaying of a warning message in a case where operation information representing that the driver D has performed operation for stopping the warning sound and the warning message has been acquired from the input apparatus 3 within predetermined time from a time at which the state information has been output. In a case where operation information has not been acquired in the predetermined time, the instructing section 126 stops the vehicle S by outputting, to the vehicle control apparatus 4, instruction information representing an instruction for stopping the vehicle S. The predetermined time is time (e.g. ten seconds) predicted to be the maximum value of time within which the driver D performs operation upon receiving a warning sound and a warning message, and is stored on the storage section 11.

<Process Sequence Performed at Driving Assistance Apparatus 10>

Figure 6:
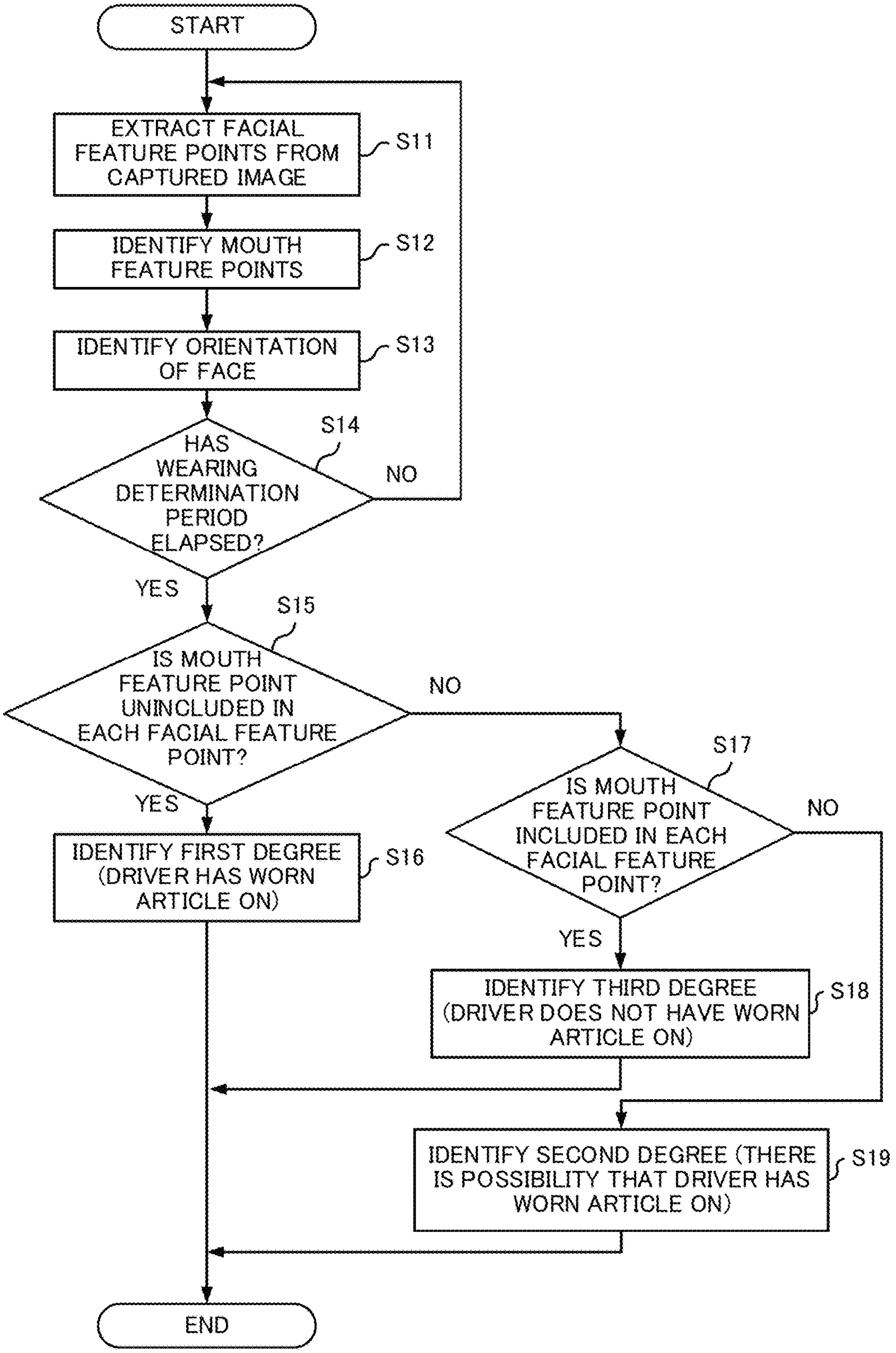
FIG. 6 is a sequence depicting an operation performed by an identifying section 123 to identify the degree of likelihood.
Figure 7:
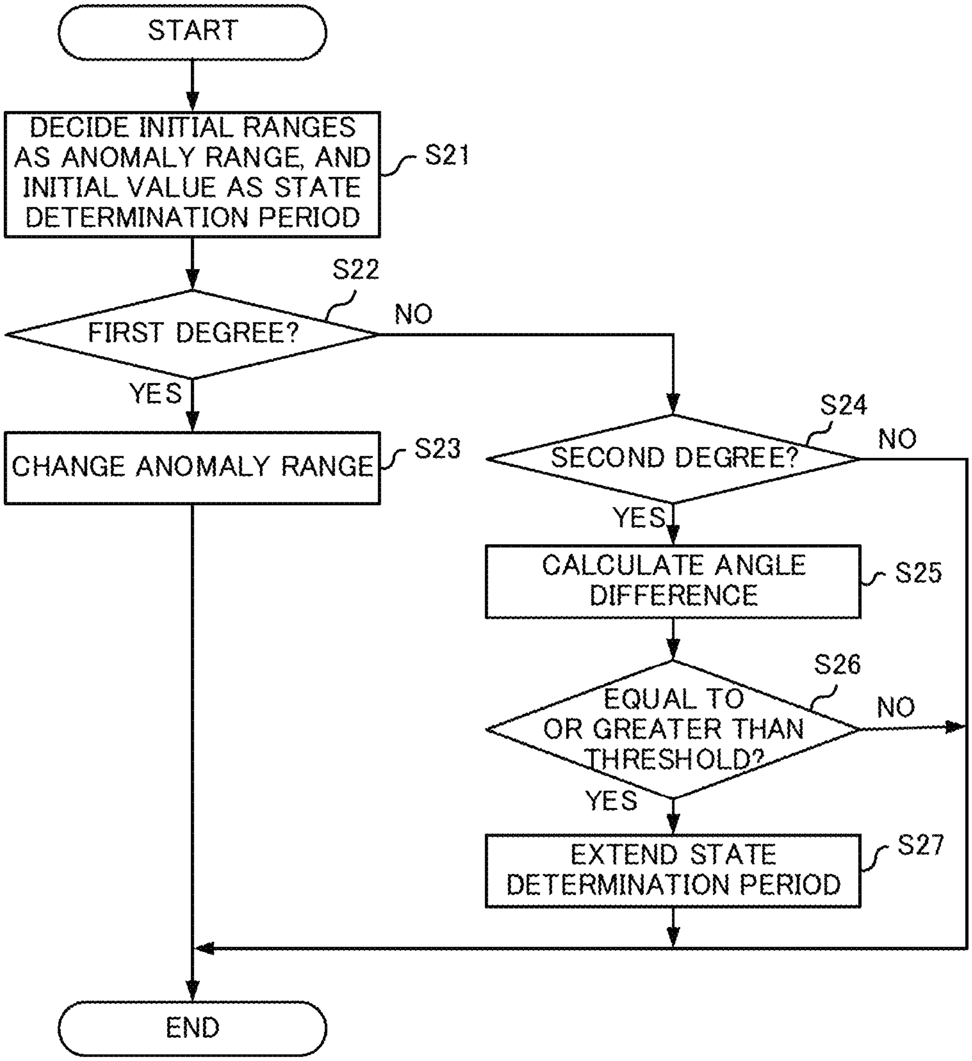
FIG. 7 is a sequence depicting an operation performed by a deciding section 124 to decide an anomaly range and the state determination period.

FIG. 6 and FIG. 7 are figures depicting examples of process sequences performed at the driving assistance apparatus 10. The process sequence depicted in FIG. 6 is a sequence representing an operation performed by the identifying section 123 to identify the degree of likelihood, and the process sequence depicted in FIG. 7 is a sequence representing an operation performed by the deciding section 124 to decide the anomaly range and the state determination period.

First, the operation performed by the identifying section 123 to identify the degree of likelihood is explained using FIG. 6. The extracting section 122 extracts facial feature points from a captured image acquired by the acquiring section 121 (S11). The identifying section 123 identifies mouth feature points included in the facial feature points extracted by the extracting section 122 (S12). The identifying section 123 identifies the orientation of the face on the basis of the facial feature points (S13). In a case where the wearing determination period has not elapsed (NO at S14), the acquiring section 121, the extracting section 122, and the identifying section 123 repeat the operations of Step S11 to Step S13.

In a case where the wearing determination period has elapsed (YES at S14), the identifying section 123 determines whether or not a mouth feature point is included in each of the facial feature points extracted by the extracting section 122 in the wearing determination period. In a case where a mouth feature point is unincluded in each facial feature point extracted in the wearing determination period (YES at S15), that is, in a case where mouth feature points are unincluded in all the facial feature points extracted in the wearing determination period, the identifying section 123 identifies, as the degree of likelihood, the first degree representing that the driver D has a worn article on her/his face (S16). In a case where mouth feature points are not unincluded in one or more facial feature points in a plurality of the facial feature points extracted in the wearing determination period (NO at S15), the identifying section 123 determines whether or not a mouth feature point is included in each facial feature point (i.e. whether or not mouth feature points are included in all the facial feature points extracted in the wearing determination period).

In a case where a mouth feature point is included in each facial feature point extracted in the wearing determination period (YES at S17), that is, in a case where one or more mouth feature points are included in all the facial feature points extracted in the wearing determination period, the identifying section 123 identifies, as the degree of likelihood, the third degree representing that the driver D does not have a worn article on her/his face (S18). In a case where, at S17, mouth feature points are not included in one or more facial feature points in a plurality of the facial feature points extracted in the wearing determination period (NO at S17), that is, in a case where facial feature points including mouth feature points and facial feature points not including mouth feature points are included in the plurality of facial feature points extracted in the wearing determination period, the identifying section 123 identifies, as the degree of likelihood, the second degree representing that there is a possibility that the driver D has a worn article on her/his face (S19).

Next, the operation performed by the deciding section 124 to decide the anomaly range and the state determination period is explained using FIG. 7. By referring to the initial ranges of the anomaly range stored on the storage section 11 and an initial value of the state determination period, the deciding section 124 decides the initial ranges as the anomaly range, and decides the initial value as the state determination period (S21). In a case where the degree of likelihood identified by the identifying section 123 is the first degree (YES at S22), the deciding section 124 changes the anomaly range by making smaller the range of the orientation of the face in the pitch direction relative to the advancing direction of the vehicle S, which range is represented by the anomaly range (S23). In a case where the degree of likelihood identified by the identifying section 123 is not the first degree (NO at S22), the deciding section 124 determines whether or not the degree of likelihood is the second degree (S24).

In a case where the degree of likelihood is neither the first degree nor the second degree (NO at S24), that is, in a case where the degree of likelihood is the third degree, the deciding section 124 ends the process. In a case where the degree of likelihood is the second degree (YES at S24), the deciding section 124 calculates the angle difference in the state determination period on the basis of the angle of the orientation of the face identified by the identifying section 123 (S25). The angle difference is the difference between: the angle of the orientation of the face in the pitch direction relative to the advancing direction of the vehicle S at a time which is a predetermined control timing interval after; and the angle of the orientation of the face at a time which is the predetermined control timing interval before the time. In a case where the angle difference calculated by the deciding section 124 is equal to or greater than the threshold (YES at S26), the deciding section 124 extends the state determination period (S27). In a case where the angle difference calculated by the deciding section 124 is smaller than the threshold (NO at S26), the deciding section 124 ends the process.

Modification Example

Whereas the explanation above illustrates an operation to decide one state determination period for determining whether or not the state of the driver D is an anomalous state, this is not the sole example. In a case where there are plurality of types of anomalous state, the deciding section 124 may decide the state determination period for each type of anomalous state.

FIG. 8 is a figure depicting initial values of the state determination period according to a modification example. FIG. 8 depicts types of anomalous state, and an initial range of the state determination period corresponding to each type of anomalous state. As depicted in FIG. 8, in a case where the type of anomalous state is a "forward-fallen posture," the orientation of the face and the orientation of the line of sight are likely to be the same orientation, and accordingly the state determination period can be made shorter. On the other hand, in a case where the type of anomalous state is a "looking-down posture," the orientation of the face and the orientation the line of sight become different orientations in some cases. Accordingly, time of re-determination increases, and the state determination period becomes longer. Note that the initial ranges of the state determination period depicted in FIG. 8 may be stored on the storage section 11.

For example, the deciding section 124 decides an initial value (initial range) of the state determination period for each type of anomalous state. For example, the deciding section 124 decides an initial value (initial range) of the state determination period such that the initial value for an anomalous state increases as time for the determining section 125 to make a determination increases. Then, for example, the deciding section 124 decides the state determination period for each type of anomalous state by changing an initial value (initial range) depending on the degree of likelihood.

Specifically, by referring to the storage section 11, the deciding section 124 decides a first state determination period "three seconds" corresponding to a "forward-fallen posture," and a second state determination period "seven seconds" corresponding to a "looking-down posture." Then, for example, in a case where the degree of likelihood is the second degree, the deciding section 124 decides, as a new first state determination period, "six seconds" obtained by multiplying the first state determination period by 2, and decides, as a new second state determination period, "14 seconds" obtained by multiplying the second state determination period by 2. Due to the operation performed by the deciding section 124 in this manner, the deciding section 124 can decide the state determination period suited for the type of anomalous state, and accordingly can further highly precisely determine whether or not the state of the driver D is an anomalous state.

<Effects Achieved by Driving Assistance Apparatus 10>

As explained above, the driving assistance apparatus 10 has: the identifying section 123 that identifies the degree of likelihood that the driver D of the vehicle S has a worn article (mask) on the face on the basis of one or more feature points of the face extracted from one or more captured images generated by capturing images of the face of the driver D; the deciding section 124 that decides the state determination period during which it is determined whether or not the state of the driver D is an anomalous state, and the anomaly range representing the orientation of the face observed in a case where the state of the driver D is an anomalous state, the state determination period and the anomaly range corresponding to the degree of likelihood; and the determining section 125 that determines whether or not the state of the driver D is an anomalous state by determining whether or not the orientation of the face based on the one or more feature points is included in the anomaly range in the decided state determination period.

By being configured in this manner, the driving assistance apparatus 10 can decide the anomaly range and the state determination period corresponding to the degree of likelihood that the driver D has a worn article on. Then, by making the anomaly range smaller, the driving assistance apparatus 10 can lower the probability that the state of the driver D is erroneously determined because the anomaly range is small, even if irregularities of a worn article are erroneously identified as the facial outline. Furthermore, by making the state determination period longer, the driving assistance apparatus 10 can determine the state of the driver D after the state has changed from a state where the orientation of the face is erroneously identified to a state where the orientation of the face can be correctly identified. As a result, the driving assistance apparatus 10 can highly precisely determine whether or not the state of the driver D is an anomalous state.

Whereas the present disclosure has been explained using embodiments thus far, the technical scope of the present disclosure is not limited by the scope of the description of the embodiments described above, but can be modified and changed variously within the scope of the gist. For example, all or some of apparatuses can be configured in a functionally or physically distributed/integrated manner in any units. In addition, embodiments of the present disclosure include also new embodiments that are generated by any combination of a plurality of embodiments. Effects of the new embodiments generated by the combination combine effects of the original embodiments.

What is claimed is:

1. A driving assistance apparatus comprising:

an identifying section that identifies a degree of likelihood that a driver of a vehicle has a worn article on a face on a basis of one or more feature points of the face extracted from one or more captured images generated by capturing images of the face of the driver;

a deciding section that decides a state determination period during which it is determined whether or not a state of the driver is an anomalous state, and an anomaly range representing an orientation of the face observed in a case where the state of the driver is an anomalous state, the state determination period and the anomaly range corresponding to the degree of likelihood; and a determining section that determines whether or not the state of the driver is an anomalous state by determining whether or not an orientation of the face based on the one or more feature points is included in the anomaly range in the state determination period.

2. The driving assistance apparatus according to claim 1, wherein the identifying section determines whether or not one or more mouth feature points representing a mouth of the face are included in the one or more extracted feature points at predetermined timings, and identifies, as the degree of likelihood, a first degree representing that the driver has a worn article on the face in a case where, in a wearing determination period including a plurality of the predetermined timings, it is determined that the mouth feature points are not included.

3. The driving assistance apparatus according to claim 2, wherein, in a case where the degree of likelihood is the first degree, the deciding section makes smaller a range of an orientation of the face in a pitch direction relative to an advancing direction of the vehicle, which range is represented by the anomaly range, than in a case where the degree of likelihood is a degree different from the first degree.

4. The driving assistance apparatus according to claim 2, wherein the determining section does not determine whether or not the state of the driver is an anomalous state in a case where the degree of likelihood is the first degree.

5. The driving assistance apparatus according to claim 1, wherein the identifying section determines whether or not one or more mouth feature points representing a mouth of the face are included in the one or more extracted feature points at predetermined timings, and identifies, as the degree of likelihood, a second degree representing that there is a possibility that the driver has a worn article on the face in a case where a determination that the mouth feature points are included, and a determination that the mouth feature points are not included are made in a wearing determination period including a plurality of the predetermined timings.

6. The driving assistance apparatus according to claim 5, wherein the deciding section makes the state determination period longer in a case where the degree of likelihood is the second degree than in a case where the degree of likelihood is a degree different from the second degree.

7. The driving assistance apparatus according to claim 5, wherein, at each of the predetermined timings in the state determination period, the deciding section calculates an angle difference between: an angle of an orientation of the face in a pitch direction relative to an advancing direction of the vehicle at a time which is a predetermined timing interval after; and an angle of the orientation of the face at a time which is the predetermined timing interval before the time, and makes the state determination period longer in a case where the degree of likelihood is the second degree, and the angle difference is equal to or greater than a threshold.

8. The driving assistance apparatus according to claim 5, wherein at each of the predetermined timings in the state determination period, the deciding section calculates an angle difference between: an angle of an orientation of the face in a pitch direction relative to an advancing direction of the vehicle at a time which is a predetermined timing interval after; and an angle of the orientation of the face at a time which is the predetermined timing interval before the time, and the determining section determines whether or not the state of the driver is an anomalous state in a case where a plurality of the angle differences calculated after the degree of likelihood has changed from the second degree to an alternative degree are smaller than a threshold in the state determination period.

9. The driving assistance apparatus according to claim 1, wherein the identifying section determines whether an orientation of the face in a pitch direction relative to an advancing direction of the vehicle is an upward orientation or a downward orientation at predetermined timings, and identifies, as the degree of likelihood, a second degree representing that there is a possibility that the driver has a worn article on the face in a case where a determination that the orientation is the upward orientation, and a determination that the orientation is the downward orientation alternate repeatedly in a wearing determination period including a plurality of the predetermined timings.

10. The driving assistance apparatus according to claim 1, wherein the determining section re-determines whether or not the state of the driver is an anomalous state on a basis of a determination result of a determination as to whether or not an orientation of a line of sight of the driver is a forward direction in an advancing direction of the vehicle, provided that the degree of likelihood is a first degree representing that the driver has a worn article on the face, and it is determined that the state of the driver is an anomalous state because the orientation of the face is included in the anomaly range.

11. The driving assistance apparatus according to claim 1, wherein the anomalous state has a plurality of types of anomalous state, and for each type of anomalous state, the deciding section decides an initial value of the state determination period such that the initial value for the type of anomalous state increases as time for the determining section to make a determination increases, and decides the state determination period for each type of anomalous state by changing the initial value depending on the degree of likelihood.

12. The driving assistance apparatus according to claim 1, wherein, at predetermined timings, the identifying section determines: whether or not one or more mouth feature points representing a mouth of the face are included in the one or more extracted feature points; and whether an orientation of the face in a pitch direction relative to an advancing direction of the vehicle is an upward orientation or a downward orientation, and identifies, as the degree of likelihood, a third degree representing that the driver does not have a worn article on the face in a case where, in a wearing determination period including a plurality of the predetermined timings, the mouth feature points are included in each of the feature points extracted from each of the captured images, and the orientation of the face in the pitch direction relative to the advancing direction of the vehicle does not alternate repeatedly between an upward orientation and a downward orientation.

13. The driving assistance apparatus according to claim 1, wherein, at each predetermined timing included in the state determination period, the determining section determines whether or not the orientation of the face identified by the identifying section is included in the anomaly range decided by the deciding section, and determines that the state of the driver is an anomalous state in a case where it is determined that the orientation of the face is included in the anomaly range in a predetermined proportion or more of the predetermined timings from among a plurality of the predetermined timings included in the state determination period.

14. The driving assistance apparatus according to claim 1, wherein the determining section determines whether or not the orientation of the face identified by the identifying section is included in the anomaly range corresponding to an alternative degree different from a second degree representing that there is a possibility that the driver has a worn article on the face after the degree of likelihood has changed from the second degree to the alternative degree in a case where the degree of likelihood is the second degree.

15. A driving assistance method executed by a computer, the driving assistance method comprising:

identifying a degree of likelihood that a driver of a vehicle has a worn article on a face on a basis of one or more feature points of the face extracted from one or more captured images generated by capturing images of the face of the driver;

deciding a state determination period during which it is determined whether or not a state of the driver is an anomalous state, and an anomaly range representing an orientation of the face observed in a case where the state of the driver is an anomalous state, the state determination period and the anomaly range corresponding to the degree of likelihood; and determining whether or not the state of the driver is an anomalous state by determining whether or not an orientation of the face based on the one or more feature points is included in the anomaly range in the state determination period.

* * * * *